(12) United States Patent
Seitzberger et al.

(10) Patent No.: US 7,543,537 B2
(45) Date of Patent: Jun. 9, 2009

(54) CRUMPLE ELEMENT COMPRISING A GUIDING MECHANISM

(75) Inventors: Markus Seitzberger, Vienna (AT);
Hans-Jorg Payer, Krems-Stein (AT);
Andreas Rittenschober, Vienna (AT);
Richard Graf, Vienna (AT)

(73) Assignee: Siemens Transportation Systems GmbH & Co KG, Vienna (AT)

( * ) Notice: Subject to any disclaimer, the term of this patent is extended or adjusted under 35 U.S.C. 154(b) by 243 days.

(21) Appl. No.: 11/574,482

(22) PCT Filed: Aug. 25, 2005

(86) PCT No.: PCT/AT2005/000342

§ 371 (c)(1),
(2), (4) Date: Apr. 11, 2007

(87) PCT Pub. No.: WO2006/024059

PCT Pub. Date: Mar. 9, 2006

(65) Prior Publication Data

US 2008/0041268 A1  Feb. 21, 2008

(30) Foreign Application Priority Data

Sep. 3, 2004   (AT) ............................... A 1486/2004
Mar. 14, 2005  (AT) ............................... A 429/2005

(51) Int. Cl.
*B61D 15/06* (2006.01)
*B61G 11/00* (2006.01)

(52) U.S. Cl. .................................. 105/392.5; 213/220

(58) Field of Classification Search .............. 105/392.5; 213/220–222; 296/187.03, 187.08, 187.09; 293/133, 154; 188/371, 377
See application file for complete search history.

(56) References Cited

U.S. PATENT DOCUMENTS

| | | | | |
|---|---|---|---|---|
| 3,842,222 A | * | 10/1974 | Hogland | 200/61.44 |
| 4,413,856 A | * | 11/1983 | McMahan et al. | 296/187.03 |
| 4,976,481 A | * | 12/1990 | Yoshihira | 293/133 |
| 6,393,999 B1 | * | 5/2002 | Schneider | 105/392.5 |
| 6,561,105 B2 | * | 5/2003 | Godin et al. | 105/396 |
| 6,688,237 B2 | * | 2/2004 | Back et al. | 105/392.5 |

(Continued)

FOREIGN PATENT DOCUMENTS

DE         1279709 B    10/1968

(Continued)

*Primary Examiner*—S. Joseph Morano
*Assistant Examiner*—Jason C Smith
(74) *Attorney, Agent, or Firm*—Sutherland Asbill & Brennan LLP

(57) ABSTRACT

A deformable element for a vehicle, particularly a rail vehicle, comprising a profiled part (CR) disposed between two end plates (AC, AP) and having the form of a tubular box, particularly of polygonal cross section for dissipating impact energy in the event of longitudinal compression by plastic deformation, and comprising a guide element (FH) disposed parallel to the longitudinal direction of said profiled part (CR), which guide element is fixed to the end plate (AC) remote from the vehicle and is capable of sliding through a through opening (DL) in the end plate (AP) facing the vehicle, wherein the end plate (AP) facing the vehicle has a through opening (DL) which has a shape which permits contactless sliding of said guide element (FH) in the longitudinal direction and lateral inclination of said guide element relative to the longitudinal direction.

17 Claims, 7 Drawing Sheets

U.S. PATENT DOCUMENTS

| | | | |
|---|---|---|---|
| 6,832,669 B2* | 12/2004 | Schobergegger et al. | 188/377 |
| 6,951,176 B2* | 10/2005 | Taguchi | 105/392.5 |
| 2006/0022473 A1* | 2/2006 | Hansen | 293/133 |
| 2008/0041268 A1* | 2/2008 | Seitzberger et al. | 105/392.5 |
| 2008/0122255 A1* | 5/2008 | Tamakoshi et al. | 296/187.08 |

FOREIGN PATENT DOCUMENTS

| | | |
|---|---|---|
| FR | 2775240 A1 | 8/1999 |
| WO | WO 01/60675 A | 8/2001 |
| WO | WO 01/60676 A | 8/2001 |

* cited by examiner

CRUMPLE ELEMENT COMPRISING A GUIDING MECHANISM

CROSS-REFERENCE TO RELATED APPLICATIONS

This is the National Stage of International Application No. PCT/AT2005/000342, filed Aug. 25, 2005, which claims benefit of Austrian Patent Application No. A 1486/2004, filed Sep. 3, 2004 and Austrian Patent Application No. A 429/2005, filed Mar. 14, 2005. These applications are incorporated herein by reference.

The subject matter of the invention is an improvement in deformable elements for vehicles, in particular railroad vehicles, comprising a profiled part in the form of a tubular box, in particular of polygonal cross section, disposed between two end plates for the dissipation of impact energy by plastic deformation in the event of longitudinal compression, and further comprising a guide element disposed parallel to the longitudinal axis of said profiled part, which guide element is rigidly connected to the end plate remote from the vehicle and is displaceable through a through opening in the end plate facing the vehicle.

Deformable elements of this type, also called crash elements in English jargon, are employed, inter alia, in vehicle production (railroad vehicle production, truck production, etc.) for controlled energy reduction in collisions. They are known components in the crumple zones of vehicles, and railroad vehicles are of particular interest in the invention described herein. However, they are also used in motor vehicles (eg, cars) or the like.

For economical and safety reasons, crumple zones are usually provided at the ends of a railroad vehicle. On the one hand, this may prevent or reduce damage to the vehicle, and on the other hand it may provide more protection to the passengers in the event of an accident. The parts of a railroad vehicle that are most frequently directly involved in accidents are the front and rear ends of the railcar, as the majority of accidents are rear-end collisions between two trains or head-on collisions with other traffic participants or obstacles (in the case of a train comprising a plurality of coupled railcars, an accident may also result in rear-end collisions between individual railcars).

According to the prior art, in order to protect a railroad vehicle, tubular deformable elements that are capable of being compressed and folded under a sufficiently strong force are installed at the front end and usually also at the rear end of said vehicle. By this means, some of the kinetic energy acting on the vehicle is expended for the deformation of the deformable element. As a consequence of this dissipation of kinetic energy, the stresses acting on the remainder of the railroad vehicle are also reduced, thus protecting the passenger areas.

In a deformable element of the type considered herein, the progressive plastic deformation characteristics of axially compressed profiles are implemented for energy dissipation in a collision ("crash"). Examples of deformable elements of this type are described in WO 011606 A1 and U.S. Pat. No. 4,492,291, in which a desired crumpling process is induced by accessory design features such as holes or folds.

In order to optimize the crumpling process, the cross sections of the deformable elements may also be configured as multicellular cross sections or consist of a plurality of components. In general, these measures serve to optimize the material usage with regard to the highest possible energy absorption, to increase the magnitude of the compression force in a given installation space, or to maintain more uniform compression force activity by the implementation of more finely corrugated buckling of the profile walls.

A "crash box" according to EP 1 398 224 A1, for example, consists of a hollow section and an inner section that is displaceably mounted in the hollow section and has arms extending toward the inside surface of the outer hollow section to reduce compression, whilst the ends of said arms are provided with an elastic material, say, a hard foam, reaching to the inside surface of said hollow section. Said arms increase the rigidity of the crash box and are also plastically deformed during the axial compression process. Alternatively, to design a crash box with a plurality of stress stages or to initiate buckling, said inner section may be made shorter than the outer crash profile.

Other possibilities for the optimization of axially compressed crash boxes include complete or partial filling of profiles with foamed materials (PU foam, aluminum foam, and the like), the use of multicellular profiles, etc.

With small cross sectional dimensions and either no or only inadequate lateral guidance (eg, in end-mounted, "freestanding" deformable elements rather than ones that are integrated in the railcar body structure), however, these elements react very sensitively to excentric stresses, which can lead to lateral divergence or overall folding of the profile producing substantially reduced energy consumption. Furthermore, distortion of the end plates results in a tendency of the collision partner to "climb up" or slide off laterally.

With the use of standard lateral bumpers, accessory deformation bodies for absorbing excessive bumper impacts are frequently disposed on the bumper supports to the rear of the bumper elements, in order to reduce energy by plastic deformation, Due to the existing installation length of the bumper, in such a construction the deformation elements can be mounted completely inside a guide sleeve, a recess box, or the like in a piston-like manner, and thus braced against cross movements during the entire compression process.

DE 17 43 253 U1 describes a hollow cylindrical deformation member as a component of a bumper support, comprising a base plate and an impact plate, and which is guided in a guide sleeve. Said guide sleeve prevents lateral divergence of the impact plate, but not, however, folding of the deformation member or distortion of the impact plate.

DE 12 79 709 B describes a bumper with a rear mounted deformation body composed of a plurality of tube sections parallel to the longitudinal axis and with an accessory longitudinal guide for the bumper in the form of a guide piston, which is rigidly fastened on the bumper-side (ie, the front) end plate and guided in a guide tube to the rear of said deformation body. This deformation body is also guided in a recess box. The guide piston of the longitudinal guide is not contactlessly mounted in said guide tube and is therefore not capable of absorbing torque generated on the bumper in an excentric collision with the guide in the recess box. Consequently, this approach is only feasible for a deformation body mounted in a housing (recess box).

DE 297 22 844 U1 describes a similar concept, namely an impact absorption device with a centering device and a deformation tube, inside which there is a tensioning element, by means of which the pretensioning force and thus the tripping energy of said deformation tube can be influenced. Said tensioning element is capable of reducing or preventing distortion of the impact plate during the compression process. However, guide means to secure said impact plate from cross movements must also be provided by accessory constructions in said invention, and therefore a recess box, a guide sleeve, or the like is also required.

In freestanding deformable elements without forward-mounted standard bumpers, such as those employed, for example, in railroad vehicles with center bumper couplings or in combination with anticlimber devices, the impact plates remote from the vehicle, which are frequently configured as ribbed anticlimber plates, collide directly with each other. The deformation elements are usually disposed directly to the rear of the anticlimber plate. For this reason, guidance in recess boxes or the like is basically only possible to a limited extent, as the potential compression distance of said deformation element cannot be fully implemented.

Known solutions for ensuring the intended axial compression of such freestanding crumple profiles even in the event of excentric stresses include accessory constructions for the absorption of shearing forces and torques, as well as a telescopic arrangement consisting of precisely matched tubes capable of sliding into each other. In general, however, both of the aforementioned reduce the compression distance useful for energy dissipation, and they furthermore involve an elaborate design.

Additionally, in axial sliding guide means, for example a telescopic arrangement, intense clamping forces are generated in general locally, at the brace points when excentric stresses are introduced, said forces, on the one hand, necessitating a rigid connection construction and, on the other hand, effecting strong secondary sliding friction in the direction of impact, which under certain circumstances can have a negative effect on the collision characteristics of the vehicle.

Other suggested solutions employ extensive crash areas, which is only possible if adequate installation space is available, or a special geometry of the crash elements, such as a conical arrangement or transverse partitioning plates within the crash profile to stabilize the crumpling process is provided. The latter, however, are only suitable if the collision partners are not excessively out of line, and they do little to prevent skewing of the contact surfaces (so that a potential negative tendency to climb up or to slide off laterally remains).

The object of the invention is therefore to improve a tubular, freestanding deformable element such that axial compression of the crumple components is assured even in the event of an excentric collision, and thus to overcome the disadvantages of the solutions known in the prior art.

On the basis of a deformable element with a profiled part disposed between two end plates in the form of a tubular box (in particular of polygonal cross section) and with a guide element disposed parallel to the crumple profile, said element being rigidly connected to the front end plate (ie, the one facing the collision partner) of said crumple profile and displaceable through a through opening in the rear end plate (ie, the one facing the vehicle itself), this object is achieved in that the design of said through opening permits contactless displacement of said guide element in the longitudinal direction and lateral inclination of said guide element relative to the longitudinal direction. It is particularly advantageous if the guide element is disposed within the crumple profile.

Undesirable lateral divergence (especially folding) of the profiled part or of the entire deformable element is avoided in a simple manner using the solution of the invention. Inclusion of the guide element on the inside of the crumple profile does not alter the effective dimensions of the overall deformable element. Furthermore, the maximum compression distance of the profiled part is not reduced by the presence of the guide element.

It should be noted that the preceding description of the guide element and the through opening obviously refer to the positional relationship of the components to each other in the undeformed state, and that it must be taken into consideration (or anticipated) that the guide element will come into (sliding) contact with the end plate in the through opening during a crumpling process in the event of an excentric collision.

In order to achieve displacement of the guide element without negatively affecting the crumpling characteristics of the profiled part, it is advisable for the design of the cross sections of the two components to be adapted such that folding of said profiled part is not hindered by the guide element. This is achieved in particular in that the cross section of said guide element leaves out that area in which the plastic deformation of said profiled part is to be expected.

It is also advantageous if the guide element aligns with the through opening. In particular, said guide element in the undeformed state of the crumple profile can project contactlessly through or into said through opening.

The embodiment of the guide element as a cruciform profile permits an excentric offset of the stresses in both transverse directions. The functionality of the guide mechanism, however, is also achieved with other cross sectional shapes of the guide profile (cylinder, rectangular profile, square profile, H profile, etc.).

The invention is especially suitable for use in a vehicle, in particular a railroad vehicle, with at least one deformable element of the invention situated in the area of a crumple zone at the end of the vehicle.

It has been shown to be particularly advantageous if the railroad vehicle has at least two deformable elements having different rigidity values (ie, different crush force magnitudes) and if preference is given to said elements being spaced apart in the transverse direction of the vehicle.

The invention, together with other advantages, is explained in greater detail below with reference to a non-restrictive exemplary embodiment illustrated in the enclosed drawings, in which.

Figure 6:
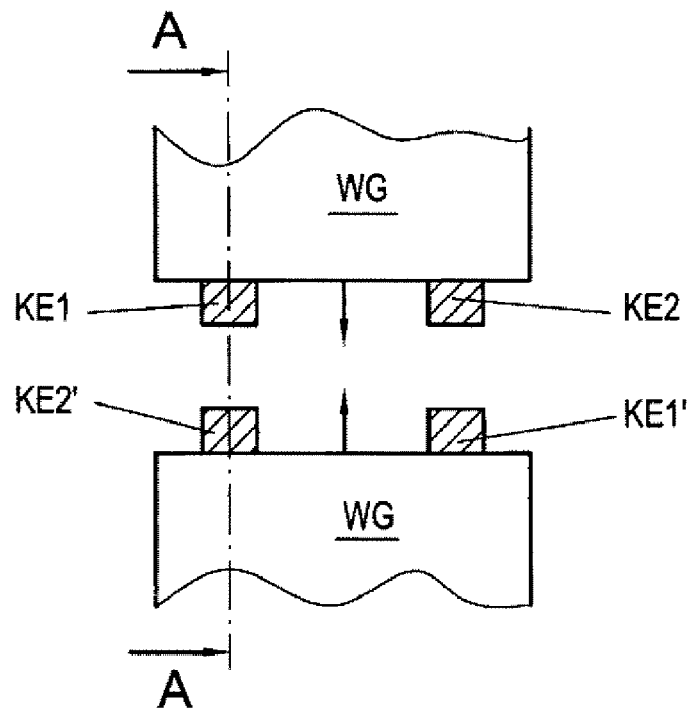
FIG. 6 shows a top view of the area V in FIG. 5.
Figure 7:
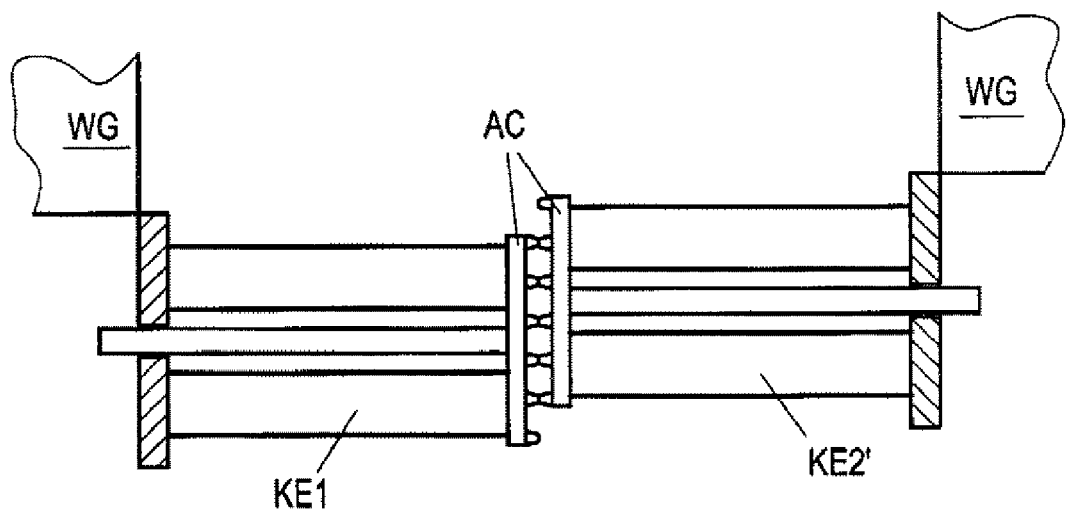
Figure 8:
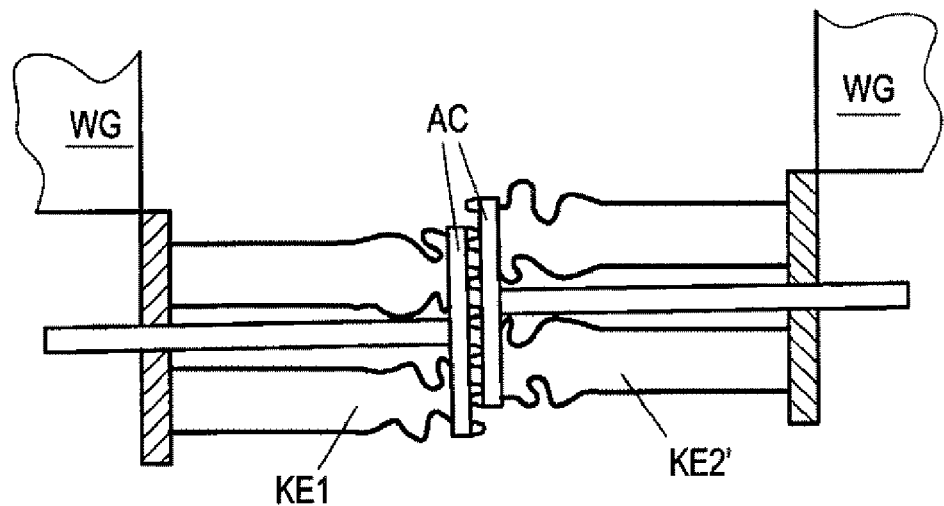
Figure 9:
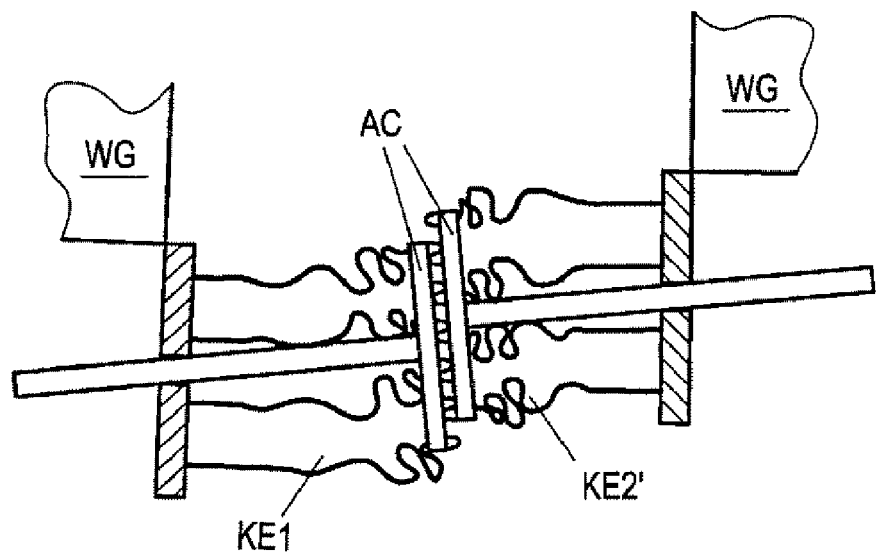
Figure 10:
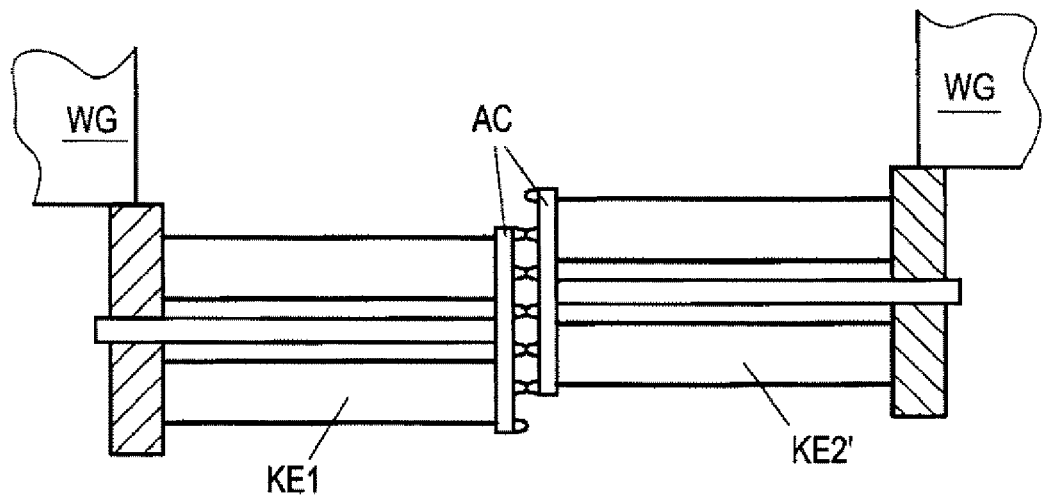
Figure 11:
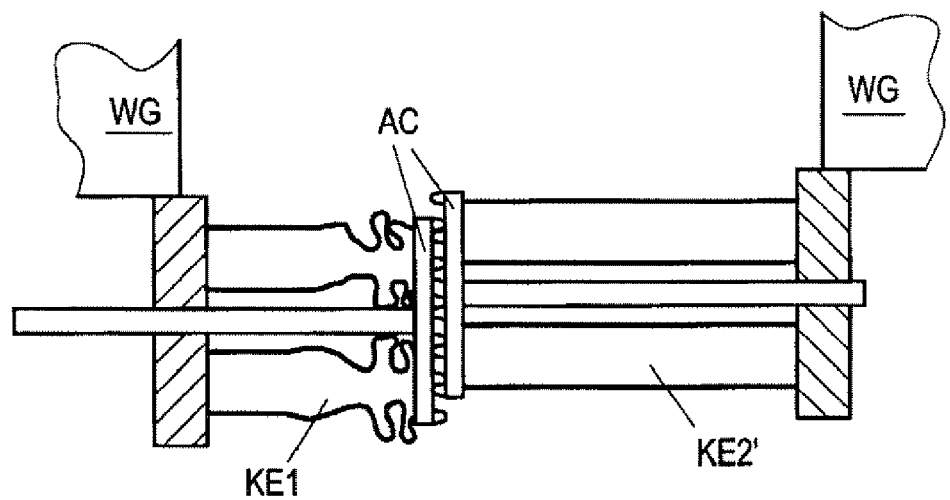
Figure 12:
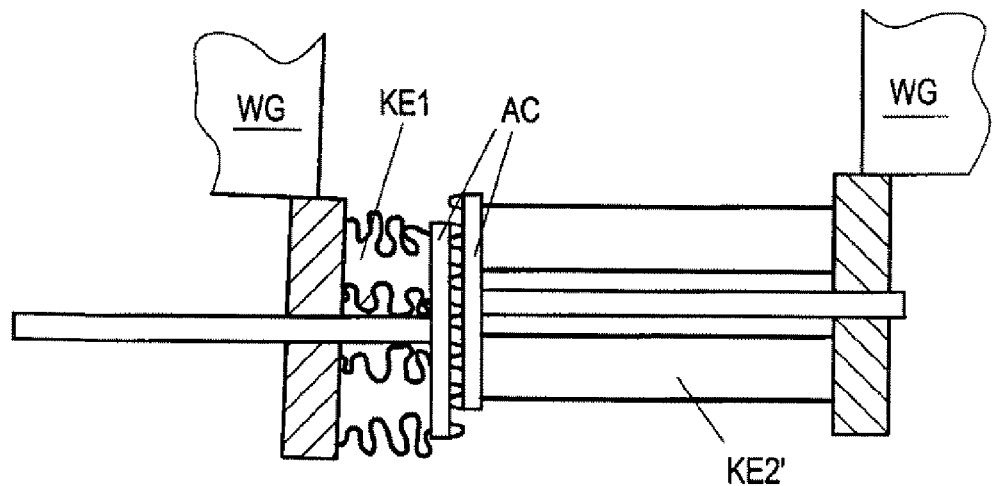
Figure 13:
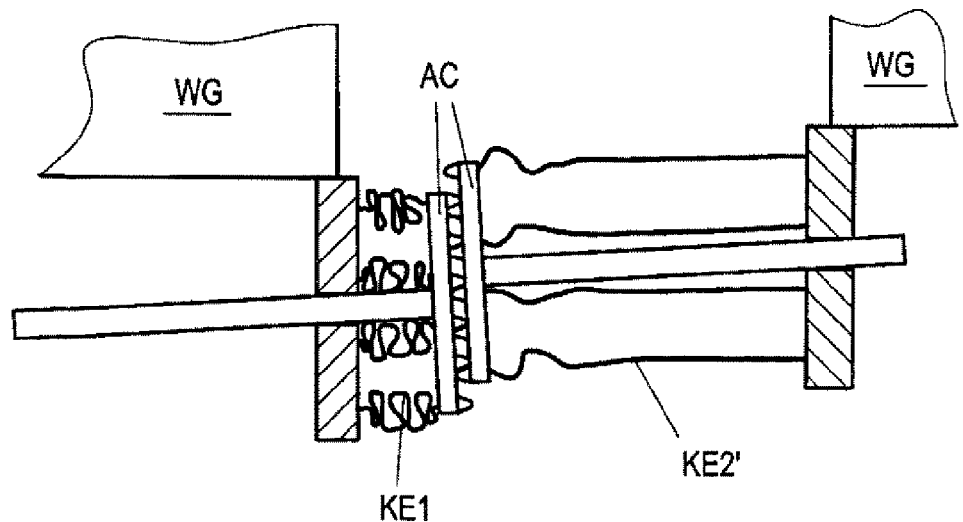

FIGS. 7-9 each show a section taken along the line A-A in FIG. 6 in various stages of deformation in a collision of two vehicles with identical deformable elements with height offset; and FIGS. 10-13 each show a section taken along the line A-A in FIG. 6 in various stages of deformation in a collision of two vehicles with a similar arrangement of deformable elements with height offset, wherein two deformable elements with different rigidity values are each arranged at the front ends of the vehicles colliding with each other.

Figure 5:
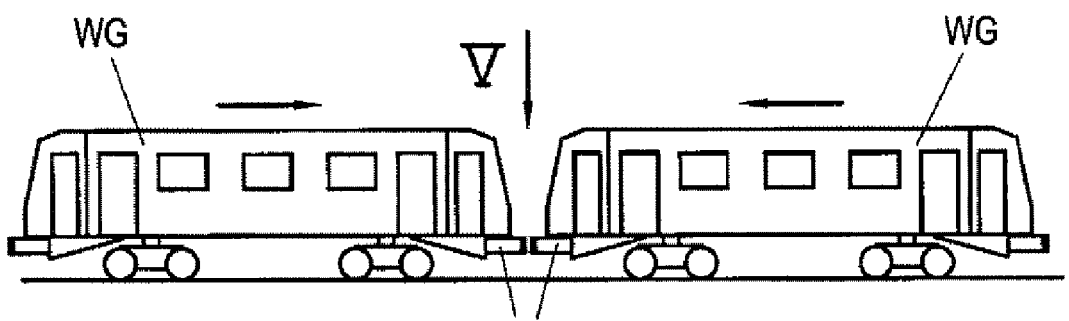
FIG. 5 shows the installation of the deformable elements on a railroad vehicle.

The exemplary embodiment relates to a deformable element for a subway railcar. In the present example, the railcar couplings should be able to absorb impacts representing a difference in velocity as great as 15 km/h. Furthermore, replaceable elements should be capable of absorbing the impact energy for which the deformable elements of the invention are designed. Said elements are disposed in a crumple zone at the end of the railcar WG, on the frame of the railcar body, as shown in FIGS. 4 and 5 (shown is an example of two such railcars WG in a collision movement).

Figure 1:
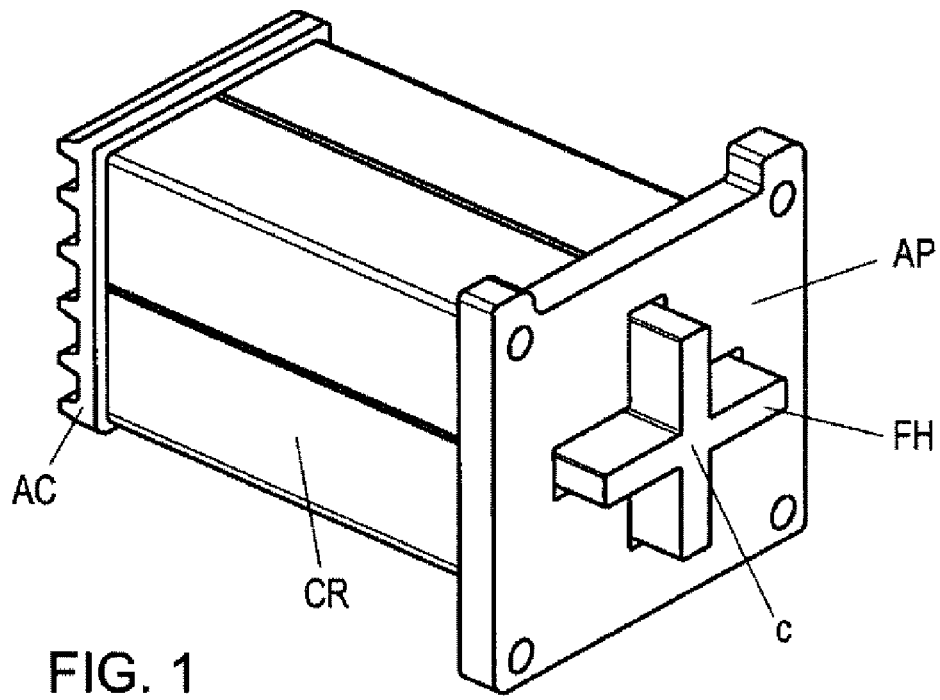
FIG. 1 shows a deformable element according to the exemplary embodiment.
Figure 2:
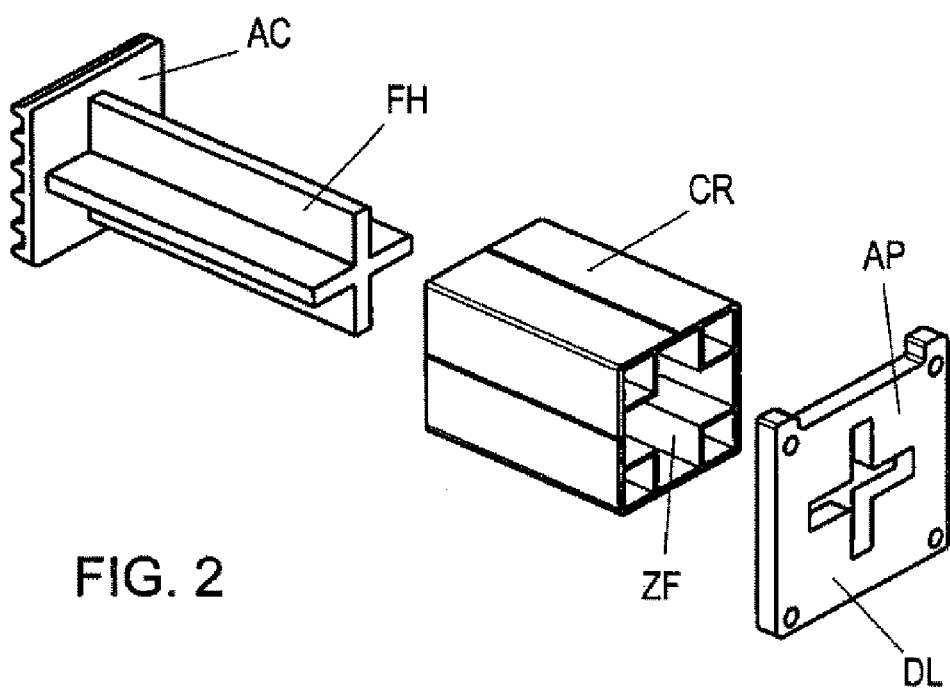
FIG. 2 shows the components of said deformable element in an expanded view.

With reference to FIG. 1, a deformable element KE has a profiled part CR ("crumple profile" or "crash profile") as well as two end plates AC, AP at the ends, which plates will bear the load of the impact. As can be discerned from the expanded representation in FIG. 2, said crash profile CR is of a basically square design. Furthermore, it has a multicellular cross section, in which square cells extend along the corners, leaving a cruciform free space ZF in the center. The outer dimensions of said crash profile of the exemplary embodiment are 280× 280×467 mm, the wall thickness being 3.9 mm.

In general, said crash profile has the shape of a (where applicable, assembled) tubular box of polygonal cross section; thus hexagonal or octagonal basic shapes are of special importance in addition to rectangular or square shapes. All of the components of said deformable element KE of the exemplary embodiment are manufactured from aluminum, but other materials, in particular steel, are conceivable.

An end plate AP serves as the base plate for fastening (for example, by bolting) the deformable element KE to the railcar body. Said plate is, say, 400×400 mm in size and has a thickness of 35 mm. The other end plate AC, remote from the vehicle, is configured as an anticlimber plate, which is, say, square with a side length of 300 mm. Anticlimber devices are well known; their function is to prevent upward divergence of one of the colliding vehicles relative to the other vehicle. In this case, ribs 20 mm in height are provided on said anticlimber plate AC for this purpose. The overall thickness of the plate AC (including the ribs) is 40 mm.

According to the invention, an accessory profile FH for the absorption of shear forces and torques generated in said deformable element KE by the introduction of excentric stresses is disposed inside said crash profile CR, said accessory profile being rigidly connected to the front plate AC by, say, a weld. This accessory profile FH serves as a guide element for the purposes of the invention, it being somewhat longer than the actual crash profile CR in the exemplary embodiment shown, in which it projects through a through hole DL in the connecting structure, said structure being composed of the end plate AP and the supporting components of the railcar (railcar frame).

With the introduction of excentric loads, shearing forces must be absorbed in addition to the normal force (in the longitudinal direction of the deformable element KE), which shearing forces in general can only be poorly absorbed by the plastically-deforming crash profile CR. Without preventive measures, there would be the risk of lateral divergence or overall folding of the crash element. The guide profile FH firmly connected to the front plate AC, coactively with the second deformable element, prevents the entire array from divergence, since the guide profile immediately comes into contact with one side of the through hole. The shearing forces generated on account of the offset can thus be significantly absorbed by the guide profile. The sliding friction forces generated by this one-sided contact are generally of subordinate significance compared with the longitudinal thrusts in the crash profile, so that the crash element KE remains relatively unaffected by the eccentricity of the impact and is predominantly axially compressed, thus assuring the main function of the crash profile CR.

Potential distortion or jamming of the guide profile FH in the connection structure (especially of the plate AP) is prevented in that the through hole DL is provided with considerable play. Thus there is no contact between the bracing structure and the guide profile with impact by a centric stress, and the guide profile is freely displaced to the rear (without the expenditure of energy) in the compression process without affecting the collapse of the crash profile CR. Even with an excentric stress, said guide profile FH is displaced without twisting or jamming. Nevertheless, it prevents undesable lateral divergence of the collapsing crash profile CR due to contact with the base plate AP.

In the exemplary embodiment shown, the guide profile FH is sturdily constructed with a wall thickness of 35 mm, in order to ensure good inherent stability as well as to enable a reliable weld of the guide profile FH to the front plate AC. The cruciform shape of the guide profile results in reliable guidance thereof in both of the transverse directions (horizontal and vertical), with minor manufacturing-related and material expenses, in particular in conjunction with the crash profile used herein, the central free space of which is likewise cruciform in cross section. Examples of other suitable cross sections are circular, square, or rectangular shapes, as well as a rotated cross (St. Andrew's cross, ie, an X shape). If only one guide in one direction is sufficient, a flat profile, an H profile, or the like can be used. In the selection of a suitable cross section, consideration should be given to avoiding detriment of the compression characteristics of the crash profile (while maintaining the desired guidance properties of the guide element).

Figure 3A:
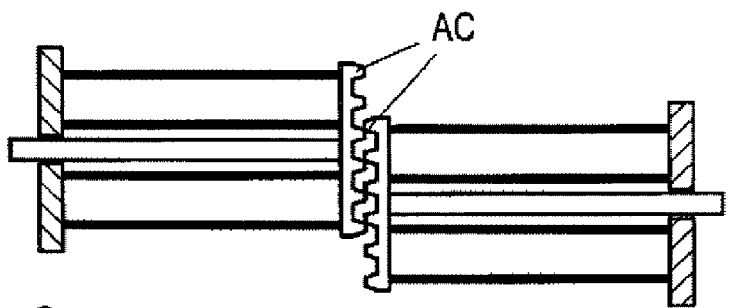
FIG. 3 shows various stages of the compression of two identical deformable elements in a collision with constant height offset.
Figure 3B:
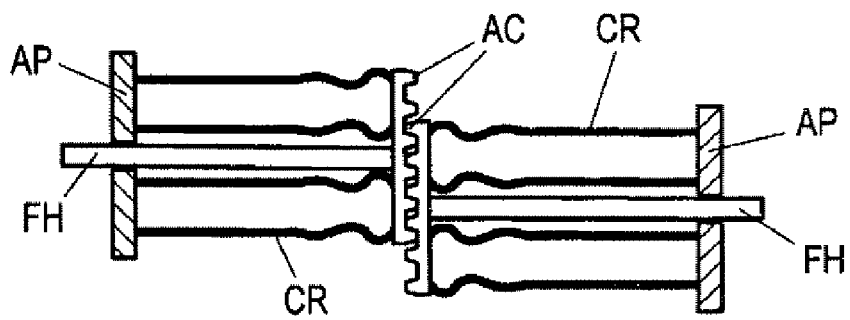
Figure 3C:
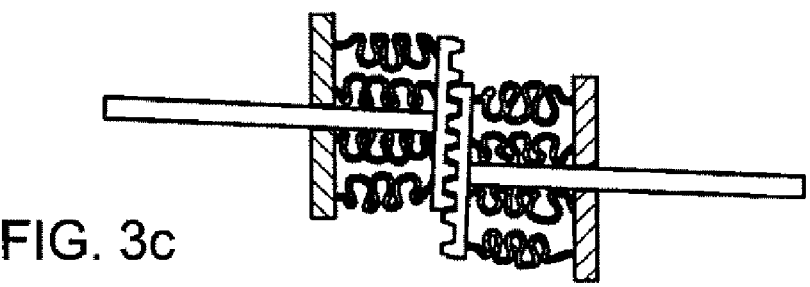
Figure 4A:
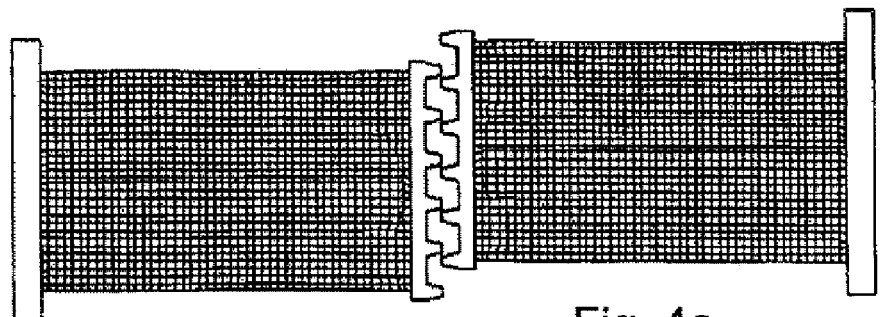
FIG. 4 shows various stages of the compression of two identical deformable elements without a guide element in a collision with constant height offset.
Figure 4B:
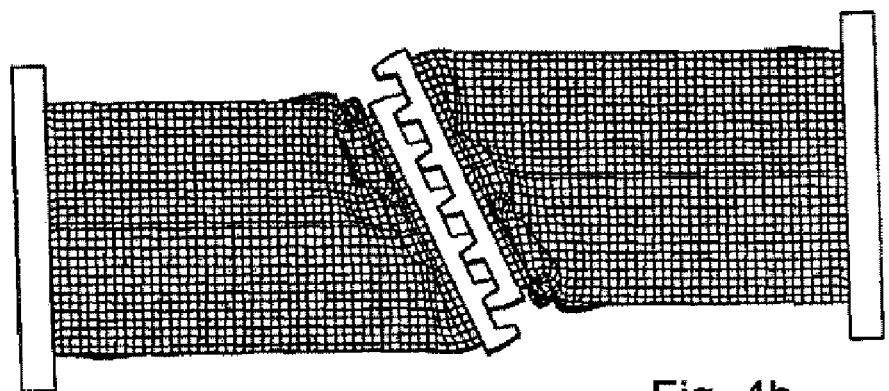
Figure 4C:
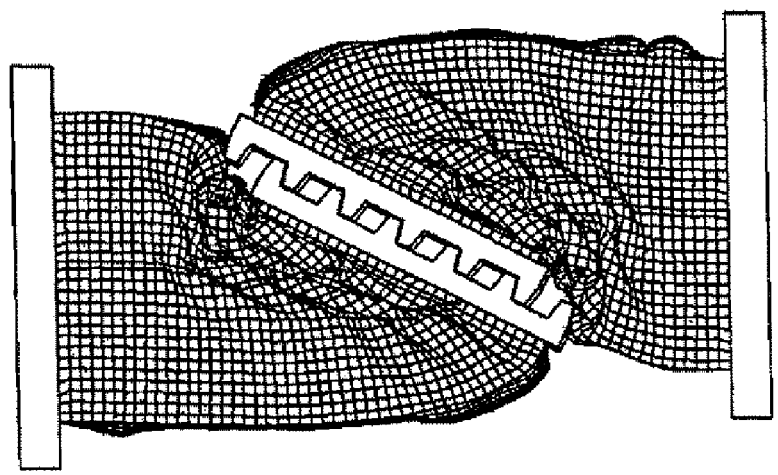

FIG. 3 demonstrates the usefulness of the invention with reference to a compression sequence in a collision with major misalignment, namely a vertical offset of 100 mm (with a crash profile height of 280 mm). The three drawings illustrate three phases of the collision, namely the initial state in FIG. 3a (anticlimber plates just making contact), the commencement of compression in FIG. 3b, and the final state in FIG. 3c (almost complete compression). FIGS. 3a to 3c are the result of a finite element simulation and represent sectional views along a vertical plane along an (original) side of the crash profile. As can be discerned from FIG. 3b, distortion of the anticlimber plates AC takes place at an early stage in the progress of the collision due to the excentric stress. Due to the invention, the amount of distortion is only minor, since more pronounced distortion is prevented by the contact of the guide profile FH in the through holes in the end plates AC. Even with further compression, the crash profile is substantially axially compressed (FIG. 3c)—despite the extreme vertical offset. The torque and the shearing forces generated by the offset are mainly absorbed by the guide profile FH and are thus deflected from the crash profile. As a consequence of such minor distortion, the climbing tendencies of the vehicles are not induced, which would otherwise be induced despite the anticlimber device of the front plate AC and thus result in climbing. In addition, without a guide element of the invention, the crash profile would be bent away in the transverse direction. FIGS. 4a to 4c show an example of the failure of a crash element without a guide mechanism with reference to a finite element simulation, such as is known from the prior art.

Correct operation of the deformable element of the invention is thus achieved even with a major misalignment, as shown in FIG. 3. The guide profile FH absorbs a substantial portion of the torques and shearing forces generated in a collision with offset and in addition it prevents severe distortion of the anticlimber plate AC. Substantially axial compression of the crash profile CR is thus achieved, and it maintains its full functionality, even with major misalignment.

Substantial advantages achieved by the invention include a simple and inexpensive construction as well as the need for only a small installation space, and a readily replaceable embodiment is possible. The manufacturing precision requirements are minor. Furthermore, a reduction of the maximum compression distance of the crash profile CR is avoided by the solution of the invention. In addition, the embodiment of the guide profile as, say, a cruciform profile allows forces and torques from misalignments to be deflected in different directions, namely in the vertical and horizontal directions.

It should be noted that the deformable element of the invention has a certain space requirement to the rear of the base plate AC, into which the guide element FH can slide in the event of compression. As a rule, however, this does not present a problem. The proposed solution can be employed very advantageously particularly in railroad vehicles, in which the crash profiles usually have sufficiently large installation heights (room for guide profiles) and in which there is usually sufficient room to the rear of the crash element for sliding through.

The example heretofore described is based on the assumption that both of the end plates AP (or the railcar bodies rigidly connected thereto) undergo no relative displacement transversally to the direction of compression, ie, the offset remains constant during the collision. If relative displacements of the vehicles during the collision are not to be neglected, an additional measure for the restriction of relative displacements or the absorption of shearing forces generated thereby, as described below, is feasible. Vertical misalignment or vertical displacements of the vehicles relatively to each other are assumed herein, without limiting the general idea of the invention.

FIG. 6 shows the ends of two vehicles, railroad vehicles in the case represented herein, each of said ends having two deformable elements of the invention. The designations KE1, KE2 refer to the deformable elements of the first of the two vehicles and the designations KE1' and KE2' refer to the deformable elements of the second vehicle. The two deformable elements KE1, KE2 of said first vehicle are spaced apart in the transverse direction of the vehicle. The same applies to the deformable elements KE1', KE2' of the second vehicle. If said deformable elements KE1, KE2, KE1', KE2' are identical in design (ie, if they have the same rigidity values), the vertical displacements of the railcar bodies in a collision of two such vehicles may not be restricted by said deformable elements KE1, KE2, KE1', KE2' until the guide means jam. If the guide means are not designed to absorb the usually extreme clamping forces or the torque generated, there is a risk of undesired damage occurring to the guide slide bearing going as far as potential blockage of the sliding mechanism. The expression KE1=KE2=KE1'=KE2' applies to the crumpling forces of said deformable elements KE1, KE1', KE2, KE2', as they are represented in FIGS. 7 to 9.

In order to achieve maximum restriction of relative vertical displacements of two vehicles colliding with each other, the front end of a vehicle of the invention has two deformable elements KE1, KE2 or KE1', KE2' of the invention with different rigidity values. The expressions KE1=KE1', KE2=KE2' and KE1<KE2, KE1'<KE2" apply to the crumpling force of said deformable elements KE1, KE1', KE2, KE2', as they are represented in FIGS. 10 to 13. The left-hand deformable element KE2, KE2' relative to the direction of travel of the first or the second vehicle, for example, can have a higher rigidity value than the right-hand deformable element KE1, KE1' relative to the direction of travel of the respective vehicle.

The more durable deformable element KE2, KE2' is capable of collapsing, say, at a force level of 750 kN, whereas the less durable deformable element KE1, KE1' has a crumpling force level of, say, 500 kN. Now when two similarly constructed vehicles, say, two railroad locomotives, collide, the more durable deformable element KE2 of the first vehicle hits the less durable deformable element KE1' of the second railroad vehicle and the more durable deformable element KE2' hits the less durable deformable element KE1. By employing deformable elements KE1, KE2, KE1', KE2' with a different crumpling force level, the response and the axial compression of the colliding deformable elements KE1, KE2, KE1', KE2' occur in succession rather than simultaneously. The more durable, initially non-crumpling deformable element KE2, KE2' takes over the vertical guidance for the less durable deformable element KE1, KE1', which is undergoing deformation. The vertical forces in the less durable deformable element KE1, KE1' are likewise substantially absorbed by the guide mechanism. The other deformable element KE2, KE2' with a higher load level only begins to compress once the less durable deformable element KE1, KE1' has been completely compressed. The first fully compressed deformable element KE1, KE1' now takes over the vertical guidance The more durable deformable element KE2, KE2' always prevents distortion of the ribbed plate AC coming into contact therewith. The less durable deformable element KE1, KE1' is likewise prevented from distortion by such distortion prevention means. The vertical movements of the two railcar bodies are thus locked to each other so that the vertical forces generated can be correctly absorbed. Vertical forces resulting from the vertical movements are thus optimally braced and a climbing of the two railcar bodies is thus optimally prevented.

The crash characteristics of vehicles with non-integrated deformable elements incorporating guide mechanisms can be decisively improved by this very simple accessory measure of placing deformable elements KE1, KE2, KE1', KE2' having different rigidity values in the crumple zone of a vehicle.

This solution is suitable for compensating potential excentricities occurring during the collision of railroad vehicles and restricting relative displacements between the vehicles, and enables the fulfillment of future crash requirements as well as demands with regard to the repair friendliness of railroad vehicles.

The invention claimed is:

1. A deformable element for a rail vehicle, comprising: a profiled part disposed between a first end plate and a second end plate and having the form of a tubular box for dissipating impact energy in the event of longitudinal compression by plastic deformation; and a guide element disposed parallel to the longitudinal direction of said profiled part, which guide element is fixed to the first end plate remote from the rail vehicle and is displaceable through a through opening in the second end plate facing the vehicle, wherein the shape of the through opening W in the second end plate facing the vehicle permits contactless sliding of said guide element in the longitudinal direction and lateral inclination of said guide element relative to the longitudinal direction.

2. The deformable element of claim 1, wherein said guide element is provided within said profiled part.

3. The deformable element of claim 1, wherein the cross-sections of said guide element and of said profiled part are shaped such that folding of said profiled part is not hampered by said guide element.

4. The deformable element of claim 1, wherein said guide element is in alignment with said through opening.

5. The deformable element of claim 4, wherein said guide element extends through said passage without contact therewith.

6. The deformable element of claim 1, wherein said guide element has a cruciform cross-section.

7. A rail vehicle, comprising at least one of the deformable elements of claim 1, which is disposed in the region of a crumple zone located at the end of the vehicle.

8. The vehicle of claim 7, which comprises at least two deformable elements of different rigidity values.

9. The vehicle of claim 8, wherein said two deformable elements are spaced apart in the transverse direction of the vehicle.

10. The deformable element of claim 1, wherein the tubular box comprises a polygonal cross section.

11. A rail vehicle comprising:
    at least one deformable element disposed in the region of a crumple zone located at an end of the vehicle, the deformable element comprising
        a profiled part disposed between a first end plate and a second end plate and having the form of a tubular box of polygonal cross section, for dissipating impact energy in the event of longitudinal compression by plastic deformation; and
        a guide element disposed parallel to the longitudinal direction of said profiled part, which guide element is fixed to the first end plate remote from the vehicle and is displaceable through a through opening in the second end plate facing the vehicle,
    wherein the shape of the through opening in the second end plate facing the vehicle permits contactless sliding of said guide element in the longitudinal direction and lateral inclination of said guide element relative to the longitudinal direction.

12. The rail vehicle of claim 11, wherein said guide element is provided within said profiled part.

13. The rail vehicle of claim 12, wherein the cross-sections of said guide element and of said profiled part are shaped such that folding of said profiled part is not hampered by said guide element.

14. The rail vehicle of claim 13, wherein said guide element is in alignment with said through opening.

15. The rail vehicle of claim 14, wherein said guide element extends through said passage without contact therewith.

16. The rail vehicle of claim 15, wherein said guide element has a cruciform cross-section.

17. The rail vehicle of claim 11, which comprises at least two of the deformable elements, and the at least two deformable elements have different rigidity values.

\* \* \* \* \*